United States Patent [19]

Saaski

[11] 4,022,592

[45] May 10, 1977

[54] LIQUID DEGASSING DEVICE

[75] Inventor: Elric W. Saaski, Richland, Wash.

[73] Assignee: McDonnell Douglas Corporation, Long Beach, Calif.

[22] Filed: Oct. 14, 1975

[21] Appl. No.: 621,876

[52] U.S. Cl. .................................. 55/189; 55/55; 23/230 EP

[51] Int. Cl.² ........................................ B01D 19/00

[58] Field of Search ............ 55/55, 189; 23/230 EP

[56] References Cited

UNITED STATES PATENTS

| | | | |
|---|---|---|---|
| 1,898,637 | 2/1933 | Lorraine | 55/55 |
| 2,445,494 | 7/1948 | Redmond | 23/230 EP |
| 3,118,738 | 1/1964 | Jamieson | 23/230 EP |
| 3,303,002 | 2/1967 | McAuliffe | 55/55 X |
| 3,469,369 | 9/1969 | Helmke | 55/55 X |

*Primary Examiner*—Thomas G. Wyse
*Assistant Examiner*—E. Rollins Cross

*Attorney, Agent, or Firm*—D. N. Jeu; Walter J. Jason; Donald L. Royer

[57] ABSTRACT

Nonthermal and uncomplicated means and method of degassing a liquid are disclosed. The liquid degassing means includes a normally lower liquid vessel, a normally upper vapor vessel, evacuation means, and valved conduit means interconnecting with the liquid and vapor vessels and evacuation means. A trace gas manometer connecting with the liquid vessel is preferably included to measure the residual gas content at any time. The liquid degassing means is agitated to obtain good mixing of the liquid and vapor so that gas in the vapor is in equilibrium with gas dissolved in the liquid. The fluid is then transferred to the lower liquid and manometer vessels, and gas-laden vapor is isolated from the liquid and evacuated from the vapor vessel to remove a large amount of gas along with a relatively small amount of liquid in vapor form. The cycle is repeated until the necessary fluid purity is attained.

6 Claims, 5 Drawing Figures

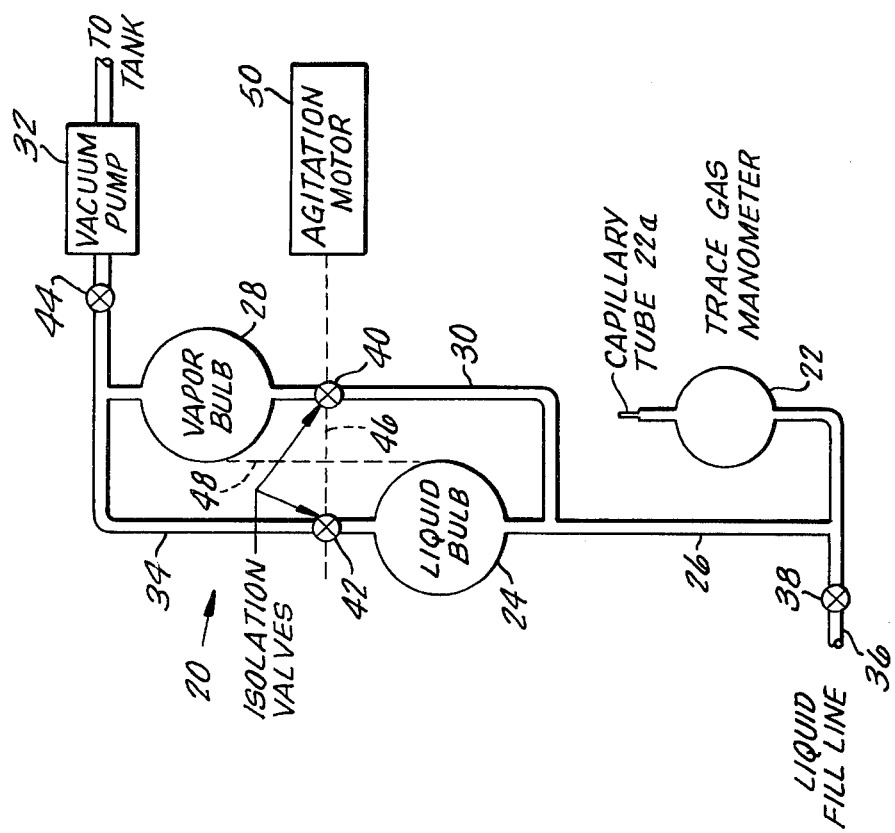
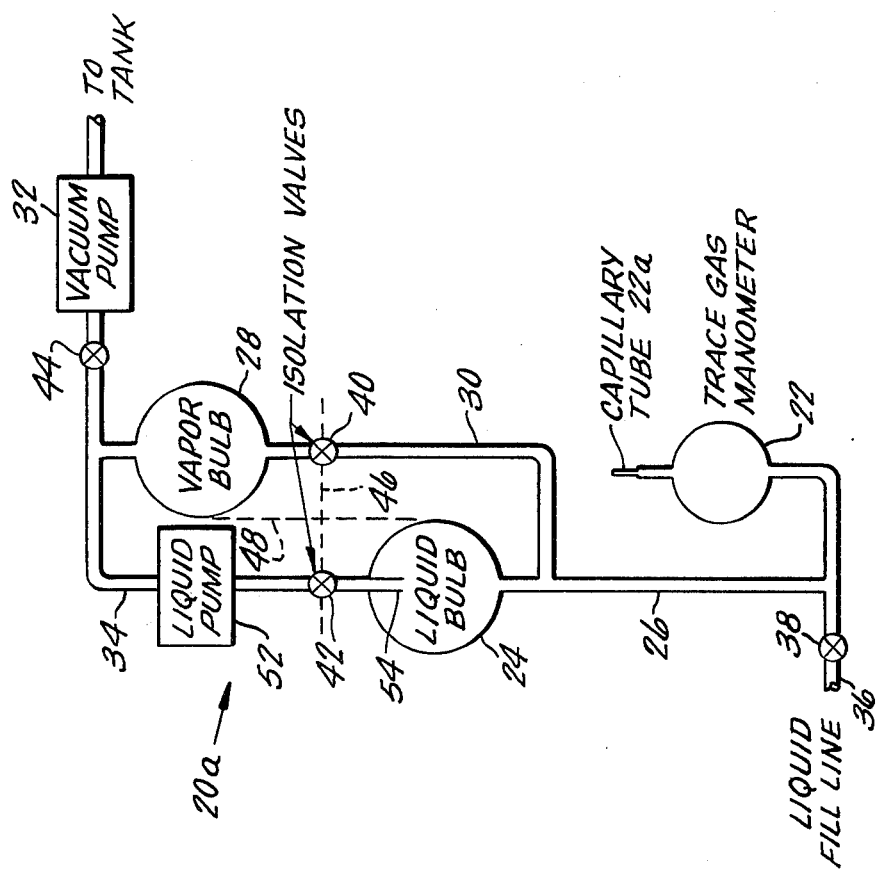

LIQUID DEGASSING DEVICE

BACKGROUND OF THE INVENTION

My present invention relates generally to the removal of dissolved gases and vapors from liquids to enhance and improve fluid properties. More particularly, the invention relates to a novel means and method of degassing a liquid to provide a very high purity working fluid of extremely low residual gas content.

The presence of trace amounts of gas in many liquids significantly affects fluid properties. The presence of a noncondensable gas promotes the onset of nucleate boiling in fluids, and it is strongly suspected that dissolved gases also contribute significantly in cavitation phenomena. In addition, such gases can interfere with the measurement of several fluid or system properties, including vapor pressure, virial coefficients, gas/liquid solubility, and gas/liquid diffusivity. Several methods for degassing fluids are presented in the open literature, but each suffers from difficulties in practical applications.

Of the methods for degassing a fluid, possibly the most familiar consists of partially filling a container with the fluid, freezing it, pumping away the gas above it, thawing it, refreezing, and so on for as many cycles as necessary to stabilize the value of a reference parameter such as vapor pressure.

A variation of the above-described technique with low-vapor-pressure fluids is to maintain a vacuum above the fluid, until some reference parameter stabilizes. See, for example, "Review and Modification of Experimental Technique to Determine Gas Diffusivity in Liquids" by D. Wotton et al., Proceedings of the Fifth Symposium on Thermophysical Properties, Newton, Massachusetts, September 1970.

Another fluid degassing technique utilizes a continuously refluxing distillation column. A closed vertical tube is partially filled with fluid. By heating the lower end while cooling the upper end, a two-phase reflux cycle is established. Noncondensable gas is swept by vapor flow to the cold end of the column where it forms a gas plug that can be detected by thermocouples along the axis of the condenser section. This plug is then removed through a pumping port at the extreme condenser end. Refluxing and pumping continue until no gas plug can be detected by the thermocouples.

Another method discussed in the literature is vacuum sublimation. See, for example, "An Apparatus for Degassing Liquids by Vacuum Sublimation" by T. N. Bell et al., J. Phys. Chem. 72, 1968. Fluid is frozen, then connected to a chamber which has a cold finger kept below the freezing point of the fluid. Sublimation mass transfer from the frozen pool onto the finger occurs while the chamber is being pumped. Bell et al. maintain that essentially all gas is removed during this sublimation/condensation process. A 40-cc sample takes from 1 to 2 hours to process.

These four techniques vary in sophistication, each with merits and faults. The freeze-thaw technique ultimately reaches a low gas content, but the process is inherently tedious and requires temperatures below the freezing point of the fluid, necessitating in some cases, cryogenic temperatures and associated costs.

Vacuum degassing also gives a low gas content, but suffers from large fluid fraction losses and is useful with only a very limited number of fluids with sufficiently low vapor pressure. It is attractive because it is a room temperature operation requiring only a vacuum pump.

A continuously refluxing column has good potential for scaling to large batches, but is the most ineffective method. Even when there is no detectable gas leg in the column, there can still be enough gas to affect many systems. Drawing off the gas leg can also result in significant fluid loss inthe form of vapor. To achieve good separation and degassing in a short time, it is often desirable to apply high heat to the fluid pool. It is possible that attendant high surface temperatures can decompose or modify the fluid composition, possibly even producing more impurity gas.

Vacuum sublimation produces the lowest gas content of the four methods but requires, in some instances, cryogenic temperatures. The process is extremely slow for large batches because of the low mass transfer rates characteristic of sublimation. It is the least scaleable of the four processes.

A fault common to all four methods is the lack of a straightforward quantitative measure of impurity gas content during processing. At high gas levels, a pressure measurement is adequate to establish vapor composition and fluid composition if the impurity gas/liquid solubility is known, but without sophisticated instrumentation, low gas levels are difficult to detect for systems not at laboratory ambient.

SUMMARY OF THE INVENTION

Briefly, and in general terms, my invention is preferably accomplished by providing a quantitative apparatus and method of degassing fluids. The governing equations for this technique allow calculation of the volume of gas in solution as degassing progresses. The apparatus is operated at laboratory ambient, uses a single vacuum pump, and degasses most fluids to $10^{-4}$ to $10^{-5}$ atmosphere (atm) with a minimal loss of material. In many cases, a rough estimate of the impurity gas composition can be made. Also, the degassing of many binary mixtures is possible with minimal change of the stoichiometry of the mixture.

When a noncondensable gas is in equilibrium with a fluid and its vapor, the partial pressure of the gas above the fluid is given by Henry's law, $$P_g = HX_g \qquad (1)$$

where $P_g$ is the gas pressure, H is the Henry's law constant, and $X_g$ is the mole fraction of gas in the liquid. A more convenient way to express this is by the Ostwald coefficient, $$a = p_{gl}/p_{gv} \qquad (2)$$

where $a$ is the Ostwald coefficient, $p_{gl}$ is the number of moles of gas per unit volume of liquid, and $p_{gv}$ is the number of moles of gas per unit volume of vapor. Table A below shows the Ostwald coefficient for a number of gases and liquids at 25° C. The parameter $d$ in Table A is used to rank fluids as to solvent power.

TABLE A

| | Experimental Solubilities at 25° C | | | | |
| | LIQUID | | | | |
| | Freon-113 | CCl$_4$ | Ammonia | Methanol | Water |
|---|---|---|---|---|---|
| d | 7.2 | 8.6 | 13.7 | 14.4 | 23.5 |
| He | | | 0.032 | 0.036 | 0.01 |
| Ne | 0.099 | | | 0.049 | 0.011 |
| H$_2$ | 0.134 | 0.083 | 0.072 | 0.095 | 0.019 |
| N$_2$ | | 0.163 | 0.09 | 0.142 | 0.016 |

TABLE A-continued

| | Experimental Solubilities at 25° C | | | | |
|---|---|---|---|---|---|
| | | | LIQUID | | |
| | Freon-113 | CCl$_4$ | Ammonia | Methanol | Water |
| Co | | 0.224 | | 0.196 | |
| O$_2$ | | 0.304 | | 0.192 | 0.031 |
| Ar | 0.620 | 0.340 | 0.146 | 0.268 | 0.034 |
| CH$_4$ | | 0.724 | | 0.428 | 0.033 |
| Kr | | | | | 0.061 |
| CF$_4$ | 0.978 | 0.301 | | | |
| CO$_2$ | | 2.700 | | | 0.830 |
| Xe | 4.390 | | | | 0.122 |
| C$_2$H$_6$ | 5.830 | 5.270 | | 2.340 | 0.045 |
| Rn | | | | | 0.224 |
| C$_2$F$_6$ | 3.05 | | | | |

Most gases have an Ostwald coefficient of 0.01 to 1.0; that is, for $a = 0.01$, there is 100 times as much gas per unit volume of vapor as in the same volume of liquid. In this invention, the apparatus isolates the vapor from the liquid, and gases in the vapor phase along with the isolated vapor are pumped off to remove a great deal of impurity gas together with a relatively small amount of fluid in vapor form. When the liquid and any remaining isolated vapor are allowed to come in contact again, and gas equilibrium re-established, the fluid will have lost some impurity gas in the process.

BRIEF DESCRIPTION OF THE DRAWINGS

My invention will be more fully understood, and other advantages and features thereof will become apparent, from the following description of an exemplary embodiment and method according to this invention. The description is to be taken in conjunction with the accompanying drawings, in which:

FIG. 1 is an elevational view, in somewhat simplified and diagrammatic form, of an illustrative embodiment of this invention;

FIG. 2 is an elevational view, in similarly simplified and diagrammatic form, of a variation of the invention embodiment shown in FIG. 1;

DESCRIPTION OF THE PRESENT EMBODIMENT AND METHOD

Figure 3:
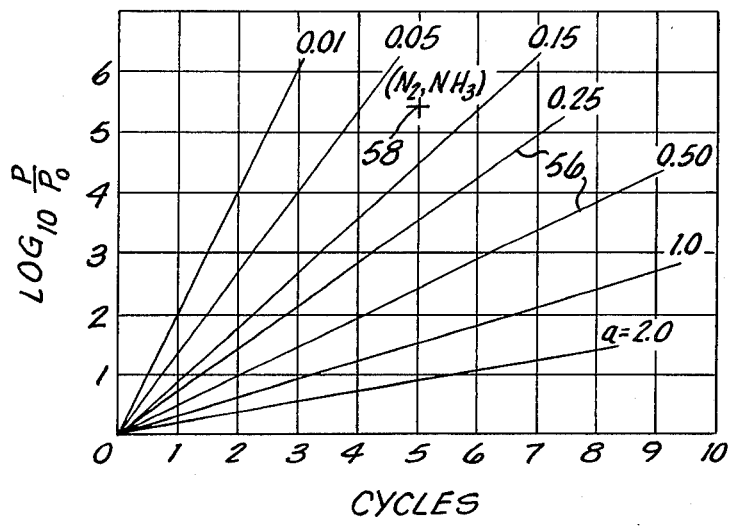
FIG. 3 is a graph showing plots of the log of the ratio of gas pressure after $n$ cycles of degassing processing of a fluid to initial gas pressure, as a function of $a$ (the Ostwald coefficient) and $n$, with the ratio of total vapor volume to total liquid volume held constant at 1.0.

In the following description and accompanying drawings of an exemplary embodiment and method according to my invention, some specific values and types of materials are disclosed. It is to be understood, of course, that such values and types of materials are given as examples only and are not intended to limit the scope of this invention in any manner.

FIG. 1 is an elevational view, in somewhat diagrammatic and simplified form, of an illustrative embodiment of a liquid degassing device 20 according to this invention. The degassing apparatus or device 20 includes, in this instance, a trace gas manometer 22, a lower liquid bulb or vessel 24 connecting with the manometer by tubing 26, an upper vapor bulb or vessel 28 connecting with the liquid bulb by tubing 30, and an evacuation pump 32 connecting with the liquid and vapor bulbs by tubing 34. The manometer 22 includes a capillary tube 22a, and the tubing 26 can be connected to a liquid fill line 36 through a valve 38. Isolation valves 40 and 42 are provided respectively in the tubings 30 and 34 between the liquid and vapor bulbs 24 and 28. Another valve 44 is provided in the tubing 34 between the pump 32 and the liquid and vapor bulbs 24 and 28 as illustrated in FIG. 1.

The intersecting broken lines 46 and 48 schematically indicate that the liquid and vapor bulbs 24 and 28 are mechanically connected laterally and vertically. For example, both of the liquid and vapor bulbs 24 and 28 can be fixedly mounted to a common panel (not shown). Actually, the entire apparatus or device 20 can be mounted to a common structure. A vibration motor 50 or other suitable means is connected to agitate the common panel or structure mounting the apparatus 20 when required to obtain good mixing of the fluid and vapor so that gas in the vapor is in equilibrium with gas dissolved in the liquid. Instead of by agitation, the motor 50 can be deleted and a good mixing of the vapor and liquid phases can be achieved at each cycle by a mechanical pump and spray head (not shown). The pump would pump fluid from the lower liquid bulb 24 to the upper vapor bulb 28 and be sprayed into it, for example.

In degassing a fluid, the liquid and manometer bulbs 24 and 22 are filled with the fluid to be degassed after the entire system has been evacuated. Filling is accomplished through fill valve 38. The upper bulb 28 contains fluid vapor and whatever gases were included in or introduced with the fluid sample. The entire apparatus or device 20 is agitated by motor 50 (or even manually) to obtain good mixing of the fluid and vapor so that gas in the vapor is in equilibrium with gas dissolved in the liquid as mentioned above. Mixing of the fluid and gases and vapor takes place wherever conditions make it possible in all components of the apparatus 20 although mixing obviously occurs to a greater extent in the larger bulbs or vessels than in the relatively small connecting tubings. The fluid is then completely transferred to the lower two vessels 22 and 24, and the two isolation valves 40 and 42 are closed so as to separate the fluid and vapor. The valve 44 is then opened and the gas-laden vapor is pumped out of the vapor bulb 28 by evacuation pump 32 (an educator or vacuum pump) into a container tank (not shown).

After the gas-laden vapor has been pumped out of the vapor bulb 28, the valve 44 is closed and the isolation valves 40 and 42 are reopened. The fluid-vapor composite is again agitated, after which the valves 40 and 42 are closed. The valve 44 is reopened and the vapor is pumped out from the vapor bulb 28 again by the pump 32. This cycle is continued repeatedly until the necessary fluid purity is attained.

The amount of gas in the vapor at any time is found by rotating the device 20 so as to remove liquid from the manometer bulb and then trapping a gas leg in the closed-end arm of the manometer 22 and imposing a gravity fluid head on the trapped volume. Although not a precise instrument, the manometer 22 as designed covers a $10^6$ pressure range, primarily because the size of the small compressed bubbles can be easily determined with a calibrated eye loupe in an appropriately sized capillary tube 22a.

FIG. 2 is an elevational view, in somewhat simplified and diagrammatic form, of a variation 20a of the invention embodiment 20 shown in FIG. 1. Instead of by agitation, the motor 50 can be deleted and a good mixing of the vapor and liquid phases can be accomplished at each cycle by using a liquid pump 52 and tubing extension 54. In this instance, the pump 52 is connected to tubing 34 between the liquid and vapor bulbs 24 and 28. The tubing extension 54 can extend about halfway down into the liquid bulb 24 as indicated. The vacuum pump 32 can, of course, work through the hermetically sealed liquid pump 52. When the pump 52 is turned on, liquid is pumped up into the vapor bulb 28 and normally flows down the internal wall surfaces thereof spread out in a thin film to achieve a good mixing of the vapor and liquid phases. This liquid is returned through the tubing 30.

FIG. 3 is a graph showing straight line plots 56 of the log of the ratio of gas pressure after $n$ cycles of degassing processing of a fluid to initial gas pressure, as a function of $a$ (the Ostwald coefficient) and $n$, with the ratio of total vapor volume $V_v$ to total liquid volume $V_1$ held constant at 1.0. If the initial gas pressure above the liquid is $P_o$, after $n$ cycles, the pressure decreases to $$P = P_o \left[ \frac{a}{a + (V_v/V_1)} \right]^n \quad \text{(Eq. 3)}$$

where $V_v$ and $V_1$ are the total vapor and liquid volumes, respectively.

Some fluid is, of course, lost in processing. The fraction $y$ of the fluid lost after $n$ cycles is $$y = nQ \, (V_v/V_1) \quad (4)$$

Q is a fluid/vapor partition factor given as $$Q = MP_s/\rho_1 RT \quad (5)$$

where
M = atomic weight,
$P_s$ = saturation pressure,
$\rho_1$ = fluid mass density,
R = gas constant, and
T = temperature.

Table B below lists a number of fluids and their partition factors. A low Q means that a large number of cycles $n$ can be completed with a small loss of fluid. This is an important factor if very low gas levels are required. If $y$ is set at 5%, for example, a fluid with a Q = $100 \times 10^{-4}$ and an impurity gas with $a = 0.15$ can only be degassed to about $10^{-6}$ of the original gas concentration.

TABLE B

| FLUID | Fluid/Vapor Partition Factor Q at 20° C $Q(\times 10^{-4})$ |
|---|---|
| Water | 0.173 |
| Ethanol | 1.39 |
| Methanol | 2.13 |
| Benzene | 3.70 |
| Carbon Tetrachloride | 4.73 |
| Bromine | 5.17 |
| Acetone | 7.28 |
| Hexane | 8.68 |
| F-113 (CCl$_2$F—CClF$_2$) | 17.9 |
| Ethyl Ether | 25.2 |
| F-21 (CHCl$_2$F) | 45.9 |

TABLE B-continued

| FLUID | Fluid/Vapor Partition Factor Q at 20° C $Q(\times 10^{-4})$ |
|---|---|
| Sulfur Dioxide | 64.0 |
| Ammonia | 98.5 |
| Methyl Chloride | 112.0 |
| Freon-12 | 214.0 |
| F-22 (CHClF$_2$) | 272.0 |
| Propane | 304.0 |

For a sample calculation, assume that a sample of ammonia at 25° C is saturated with 1.0 atm of nitrogen $N_2$ in the vapor phase, and the level to which the ammonia is degassed without losing more than 5% of the ammonia is to be determined if $V_v/V_1 = 1.0$. First, from Table B, the partition factor Q for ammonia is determined as $98.5 \times 10^{-4}$. Substituting this value in Equation 4, the maximum number of cycles $n$ is 5. From Table A, the solubility of nitrogen in ammonia is 0.09. Substituting the known factors in Equation 3, the final partial pressure of $N_2$ after 5 cycles is 3.74 ($10^{-6}$) atm or 2.84 microns partial pressure. The final concentration of nitrogen in the gas phase is 0.38 ppm, while in the liquid phase, the mole fraction of gas is $$X_{al} = (_MP_{N_2}/RT) = 3.82 \, (10^{-10}) \quad (6)$$

The point 58 corresponding to this example is marked on FIG. 3. Using this exceedingly simple technique, very low theoretical gas levels are indicated with only small fluid losses.

For experimental verification, the apparatus or device 20 of FIG. 1 was originally tested on methanol and water, with nitrogen at 1.0 atm initial pressure. The methanol was Baker GC spectrophotometric quality and the water was double-distilled in air. The fluids were initially degassed to $10^{-4}$ to $10^{-5}$ atm total noncondensable gas content with the apparatus 20, after which anitrogen backfill to 1.0 atm was made.

Figure 4:
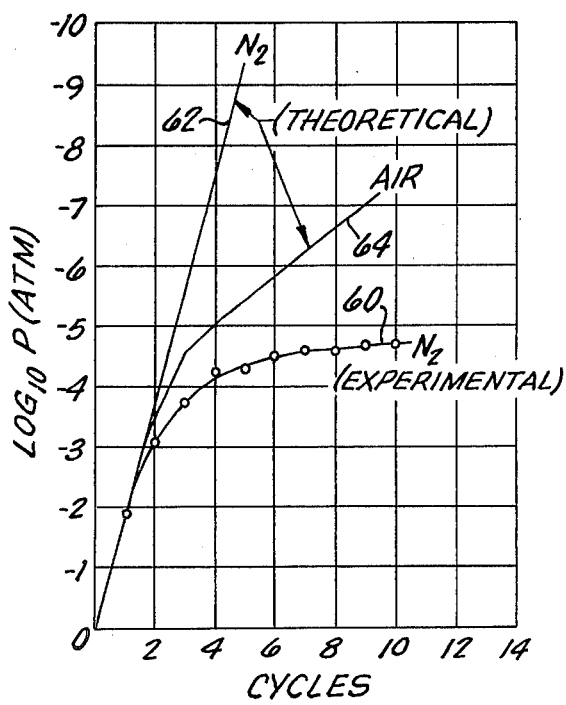
FIG. 4 is another graph showing experimental and theoretical plots of the log of total noncondensable gas partial pressure as a function of cycles of degassing processing of water, with the ratio of total vapor volume to total liquid volume equal to 1.25.

FIG. 4 is a graph showing experimental and theoretical plots 60 and 62 of the log of total noncondensable gas partial pressure as a function of cycles of degassing processing of water, with the ratio of total vapor volume $V_v$ to total liquid volume $V_1$ equal to 1.25. The theoretical curve or plot 64 of air degassing of water is also shown for comparison. The greater difficulty in removing air results from the trace content of $CO_2$ which has a high solubility. Comparing experiment and theory, the gas loss is initially strictly according to theory but as pressure begins to fall below $10^{-2}$ to $10^{-3}$ atm, each cycle is less effective in removing gas.

Figure 5:
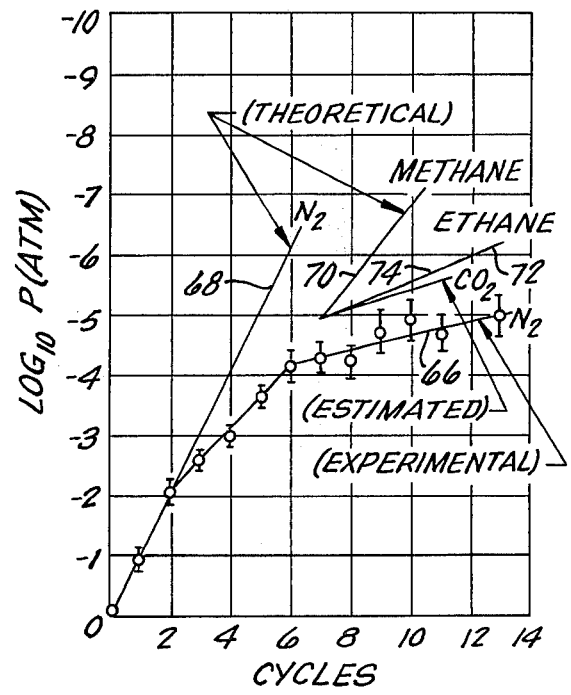
FIG. 5 is still another graph showing experimental and theoretical plots of the log of total noncondensable gas partial pressure as a function of cycles of degassing processing of methanol, with the ratio of total vapor volume to total liquid volume equal to 1,375.

FIG. 5 is another graph showing experimental and theoretical plots 66 and 68 of the log of total noncondensable gas partial pressure as a function of cycles of degassing processing of methanol, with the ratio of total vapor volume $V_v$ to total liquid volume $V_1$ equal to 1.375. Theoretical curves or plots 70, 72 and 74 respectively of methane, ethane and $CO_2$ degassing of methanol are also shown. As can be seen by comparing the experimental and theoretical plots 66 and 68, the gas loss is initially strictly according to theory but as pressure begins to fall below $10^{-2}$ to $10^{-3}$ atm, each cycle is less effective in removing gas as was the case with degassing processing of water.

Although there is some dropoff in efficiency of the apparatus 20 as pressure falls below $10^{-2}$ to $10^{-3}$ atm, a respectable fluid purity was still obtained in a reasonable number of cycles; i.e., 5 to 10. In this connection, it might be noted that the Bell et al. article referenced earlier lists nine other references giving precision vapor pressure measurements for common organic liquids, and the minimum error in this literature was about 4 ($10^{-5}$) atmosphere, or $\log_{10}(P) = -4.28$. The degassing accomplished with the very simple apparatus 20 exceeds this purity level.

The deviation from theory has been investigated in some detail and a partial explanation is possible. In both water and methanol, there is apparently a small amount of residual dissolved $CO_2$ both from atmospheric contamination and the leaching of carbonates or bicarbonates from glass or metal components. At $CO_2$ pressures on the order of 1.0 atm, in water there is roughly a linear dependence of dissolved $CO_2$ on gas pressure above the liquid and Henry's law is valid, but at $CO_2$ partial pressures considerably below one atmosphere, the $CO_2$ is effectively frozen in solution as bicarbonate. For dilute solutions, the principal constituent in equilibrium with a $CO_2$ gas phase is bicarbonate as in $$H_2O + CO_2 \leftrightharpoons HCO_3^- + H^+ \tag{7}$$

Other equilibria are also maintained simultanously, but Equation 7 shows the effect of low $CO_2$ levels. The equilibrium constant for Equation 7 is $$\frac{(H^+)(HCO_3^-)}{(CO_2)} = 2.3 \, (10^{-5}) \tag{Eq. 8}$$

Rearranging, the bicarbonate concentration is given in terms of the gas concentration and pH as $$(HCO_3^-) = \frac{2.3 \, (10^{-5})}{(H^+)} \cdot (CO_2) \tag{Eq. 9}$$

Equation 9 is in the form of Equation 2. That is, the equilibrium constant divided by the hydrogen ion concentration, is the effective Ostwald coefficient for this system. Because a low $CO_2$ level affects the pH of the solution only slightly, the effective Ostwald coefficient for a pH = 7 dilute solution is about 230. In Equation 3, a gas with this high a coefficient is pumped off very slowly, in qualitative agreement with observed behavior.

To test this model experimentally, a previously degassed water sample was doped to 6.5 ($10^{-3}$) molar concentration with sodium bicarbonate. Over a 10-fold increase in pressure resulted, and this pressure was virtually unaffected by several degassing cycles. The pressure was approximately 8($10^{-4}$) atm. The ultimate degassing limit for water by this technique is apparently determined by the $CO_2$-bicarbonate cycle, unless other means for $CO_2$ removal are provided. This level is about $10^{-5}$ atm partial pressure of $CO_2$ in the exemplary apparatus 20 with distilled water, but lower $CO_2$ levels are possible once the source of $CO_2$ in the exemplary apparatus has been isolated.

The results in FIG. 5 indicate that methanol deviation from theory may result from two impurity gases in addition to nitrogen. From Table A and Equation 3, the slope of a plot as in FIG. 5 should uniquely identify the impurity gases when the impurity levels and solubility factors differ by a significant amount. As shown by Equation 3, the reduction in gas content per cycle is directly related to the Ostwald coefficient $a$. By observing the gas reduction per cycle, coefficient $a$ can be found from Equation 3. Each gas has an unique coefficient $a$, thereby indicating the impurity gas. This method will, of course, be most accurate when the dissolved gases have coefficient a values that differ greatly.

In the methanol case (FIG. 5), methane gas and ethane or $CO_2$ are suspect gas impurities. The methane is indicated as being initially present at 0.10 atm and the $CO_2$ at 3.5 ($10^{-4}$) atm. A methane level of 0.10 atm does not appear reasonable, however, and an independent method of determination may be indicated.

In summary, a simple nonthermal method of fluid degassing has been developed and compared with experimental data. Partial pressures of noncondensable gas from $10^{-4}$ to $10^{-5}$ atm have been achieved with the exemplary apparatus 20. The residual gas remaining in experiments with water and methanol has been tentatively identified as $CO_2$.

Incorporation of a manometer 22 in the apparatus 20 allows residual gas determination at all phases of fluid processing. A plot of pressure versus number of degassing cycles is useful in identifying impurity gas composition. The amount of gas removed with each cycle is related only to the solubility of the gas in the liquid and the ratio of vapor volume to liquid volume, making scaling of the apparatus 20 very easy. Process parameters, such as the number of degassing cycles needed and the vapor/liquid volume ratio, can be determined with a small model, with certainty that a large-scale model will function identically.

The technique is most appropriate for gases with low solubilities. For gases with exceptionally high solubilities, a large number of degassing cycles is necessary. Most common liquids can be degassed by this method with from 5 to 10 cycles. This discrimination of high solubility components is in one repsect desirable, because fluid mixtures can be degassed with only a small change in the mixture stoichiometry.

While an exemplary embodiment and method of this invention have been described above and shown in the accompanying drawings, it is to be understood that the particular embodiment and method described and shown are merely illustrative of, and not restrictive on, the broad invention and that I do not desire to be limited in my invention to the specific arrangements or constructions and sequences or steps shown and described, for various changes or modifications may occur to persons having ordinary skill in the art.

I claim:

1. Means for degassing a liquid comprising:
   a normally lower liquid vessel for containing a liquid to be degassed;
   a normally upper vapor vessel for containing gases and vapor to be removed;
   evacuation means;
   first conduit means connecting said liquid and vapor vessels to said evacuation means;
   first valve means provided in said first counduit means operatively connected to said liquid vessel on one side and operatively connected to said vapor vessel and said evacuation means on the other, for isolating said liquid vessel from said vapor vessel and evacuation means when said first valve means is closed;
   second valve means provided in said first conduit means operatively connected to said evacuation means on one side and operatively connected to said first valve means and said vapor vessel on the other, for closing off said evacuation means from said vapor vessel and said liquid vessel when said second valve means is closed; and means for obtaining a good mixing of said liquid and said gases and vapor largely in said liquid and vapor vessels when said first valve means is open and said second valve means is closed so that said gases in said vapor reach equilibrium with said gases dissolved in said liquid, whereby said liquid is thereafter transferred from said vapor vessel to said liquid vessel, said first valve means is closed and said second valve means is opened, and said evacuation means is operatively connected to remove said gases and vapor in said vapor vessel.

2. The invention as defined in claim 1 wherein said mixing means includes means for agitating said liquid and vapor vessels and said first conduit means.

3. The invention as defined in claim 1 further comprising means for measuring the amount of said gases in said vapor.

4. The invention as defined in claim 1 further comprising second conduit means connecting said liquid vessel to said vapor vessel, and third valve means provided in said second conduit means operatively connected to said liquid vessel on one side and to said vapor vessel on the other, for isolating said vapor vessel from said liquid vessel when said third valve means is closed, said third valve means being closed during evacuation and open during mixing.

5. The invention as defined in claim 4 wherein said mixing means includes a liquid pump connected to said first conduit means for pumping liquid from said liquid vessel to said vapor vessel, said second conduit means being capable of returning said liquid from said vapor vessel to said liquid vessel when said third valve means is open.

6. The invention as defined in claim 4 further comprising means for measuring the amount of said gases in said vapor, said gas measuring means including a normally lower trace gas manometer, said second conduit means additionally connecting said liquid and vapor vessels to said manometer, and said third valve means being capable of isolating said vapor vessel from said liquid vessel and said manometer when said third valve means is closed.

* * * * *